United States Patent
Kim

(10) Patent No.: US 8,516,344 B2
(45) Date of Patent: Aug. 20, 2013

(54) SYMBOL-LEVEL RANDOM NETWORK CODED COOPERATION WITH HIERARCHICAL MODULATION IN RELAY COMMUNICATION

(75) Inventor: Yong-Ho Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 13/061,694

(22) PCT Filed: Oct. 1, 2009

(86) PCT No.: PCT/KR2009/005670
§ 371 (c)(1),
(2), (4) Date: Mar. 1, 2011

(87) PCT Pub. No.: WO2010/039013
PCT Pub. Date: Apr. 8, 2010

(65) Prior Publication Data
US 2011/0173517 A1   Jul. 14, 2011

Related U.S. Application Data

(60) Provisional application No. 61/101,681, filed on Oct. 1, 2008.

(51) Int. Cl.
*H03M 13/00* (2006.01)
(52) U.S. Cl.
USPC .......................................... 714/774; 714/776
(58) Field of Classification Search
USPC ................................................ 714/774, 776
See application file for complete search history.

(56) References Cited

U.S. PATENT DOCUMENTS

| | | | |
|---|---|---|---|
| 7,093,178 B2 * | 8/2006 | Kim et al. | 714/748 |
| 7,260,770 B2 * | 8/2007 | Stewart et al. | 714/790 |
| 8,116,386 B2 * | 2/2012 | Eyvazkhani | 375/254 |
| 8,356,234 B2 * | 1/2013 | Choi et al. | 714/780 |
| 2002/0141360 A1 | 10/2002 | Baba et al. | |
| 2003/0079170 A1 * | 4/2003 | Stewart et al. | 714/755 |
| 2003/0120995 A1 * | 6/2003 | Kim et al. | 714/786 |
| 2003/0159100 A1 * | 8/2003 | Buckley et al. | 714/758 |
| 2004/0128665 A1 | 7/2004 | Gouleau et al. | |
| 2005/0175180 A1 * | 8/2005 | Venkatesan et al. | 380/268 |
| 2006/0285505 A1 | 12/2006 | Cho et al. | |
| 2007/0061690 A1 * | 3/2007 | Stewart et al. | 714/800 |
| 2008/0313526 A1 * | 12/2008 | Choi et al. | 714/780 |

* cited by examiner

*Primary Examiner* — Joseph D Torres
(74) *Attorney, Agent, or Firm* — Lee, Hong, Degerman, Kang & Waimey

(57) ABSTRACT

Disclosed is a novel cooperative communication strategy jointly using symbol-level random network coding and hierarchical modulation in order to effectively minimize packet error rate in error prone wireless networks. The source (or sender) broadcasts random network coded symbols with hierarchical modulation to the relays and the destination (or receiver). In following time slots, the relays, which have successfully decoded the original packet, transmit additional random network coded symbols to the destination. By applying the present disclosure into a multi-hop relay consumer device network, which comprises a set of consumer devices, error free transmission with high efficiency can be achieved.

4 Claims, 4 Drawing Sheets

(A) Block Error Rate (B) Packet Error Rate

SYMBOL-LEVEL RANDOM NETWORK CODED COOPERATION WITH HIERARCHICAL MODULATION IN RELAY COMMUNICATION

CROSS-REFERENCE TO RELATED APPLICATIONS

This application is a 371 U.S. national stage application of International Application No. PCT/KR2009/005670, filed on Oct. 1, 2009, which claims priority to U.S. Provisional Application Ser. No. 61/101,681, filed on Oct. 1, 2008, the contents of which are incorporated by reference herein in their entirety.

TECHNICAL FIELD

The present invention relates to a wireless communication system and a terminal providing a wireless communication service and to a method of jointly using symbol-level random network coding and hierarchical modulation in order to effectively minimize packet error rate in error prone wireless networks.

BACKGROUND ART

Multi-channel wireless networks represent a direction that most future 4G state-of-the-art wireless communication standards evolve towards, including IEEE 802.16 Wi-MAX and 3GPP Long Term Evolution (LTE). In both Wi-MAX and LTE, Orthogonal Frequency Division Multiple Access (OFDMA) is used at the physical layer. OFDMA uses a large number of orthogonal subcarriers to maximize spectral efficiency, and assigns different subsets to different users to achieve multiple accesses. It is common knowledge that errors are inherently present in unreliable wireless channels. The important challenge in designing error control protocols in the MAC or physical layer is to effectively maximize achievable throughput in various transmission scenarios in wireless networks even when unpredictable and time-varying errors exist.

Multi-hop relay network is one of promising communication methods on wireless networks. Multi-hop relay network provides enhanced throughput performance and coverage extension. Consumer electronic devices (e.g., cell phones, televisions, set-top boxes, washing machines, refrigerators, etc) are getting more and more networked each other. Multi-hop relay wireless network can be a proper type of communication scheme for networking consumer electronic devices due to its low implementation cost and easy configuration. However, wireless multi-hop relay communication suffers from wireless channel impairment.

DISCLOSURE OF INVENTION

Solution to Problem

Therefore, in order to overcome the wireless channel impairment, this disclosure may propose the coded cooperation in relay communication. In fact, the code cooperation in relay communication shows that the simple strategy using distributed channel coding in cooperative communication increases system performance. When hierarchical modulation is considered with the coded cooperation (denoted as "Co-HM" hereafter), additional system performance improvement and simple transmission strategy can be obtained. Further, this disclosure proposes a joint symbol-level random network coding and hierarchical modulation scheme in a relay communication (denoted as "Co-NC").

To achieve these and other advantages and in accordance with the purpose of the present invention, as embodied and broadly described herein, there is provided a method for transmitting data in wireless communication system, the method comprising: dividing an input bit stream into segments; adding error detection code into each segments of the divided input bit stream in order to generate a packet; dividing the generated packet into a plurality of blocks with fixed size; coding each of the plurality of blocks using a random linear coding in order to generate coded block bits; mapping the coded block bits to one of a hierarchical modulation bit positions, wherein the hierarchical modulation bit positions are a group of bits representing a priority class; and transmitting the plurality of modulated symbols.

To achieve these and other advantages and in accordance with the purpose of the present invention, as embodied and broadly described herein, there is also provided a method for receiving data in wireless communication system, the method comprising: receiving a plurality of modulated symbols; generating coded block bits by selecting bits from the hierarchical modulation bit positions of the received plurality of modulated symbols, wherein the hierarchical modulation bit positions is a group of bit representing the priority class; and performing a random linear decoding with the coded blocks to restore a packet.

The foregoing and other objects, features, aspects and advantages of the present invention will become more apparent from the following detailed description of the present invention when taken in conjunction with the accompanying drawings.

MODE FOR THE INVENTION

Figure 1:
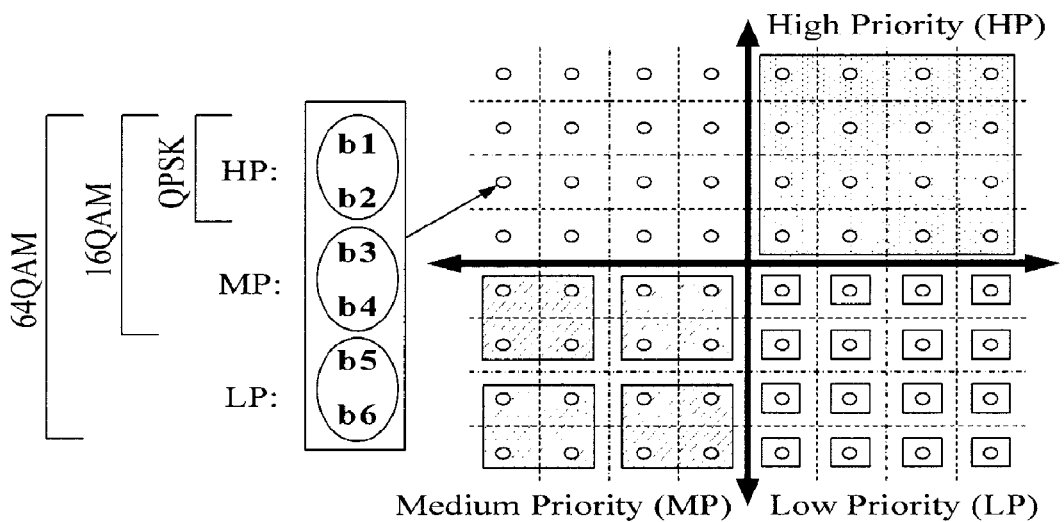
FIG. 1 shows an exemplary constellation chart for 64QAM hierarchical modulation with three classes.

One aspect of this disclosure relates to the recognition by the present inventors about the problems of the related art as described above, and further explained hereafter. Based upon this recognition, the features of this disclosure have been developed.

Although this disclosure is shown to be implemented in a specific mobile communication system, this disclosure may also be applied to other communication systems operating in conformity with different standards and specifications.

Hereinafter, description of structures and operations of the preferred embodiments according to the present invention will be given with reference to the accompanying drawings.

With respect to the objective of maximizing the resource usage performance, network coding has been originally proposed in information theory and has since emerged as one of the most promising information theoretic approaches to improve throughput. For example, a MIXIT, which utilize a protocol for cooperative packet recovery by performing random network coding across correct symbols and opportunistic routing on groups of correctly received symbols, has been proposed. A MIXIT system improves a throughput of wireless mesh networks. Instead of insisting on forwarding only correct packets, the MIXIT routers use physical layer hints to make their best guess about which bits in a corrupted packet are likely correct and forward them to the destination. Even though this approach inevitably lets erroneous bits through, it has been proved that it achieves high throughput without compromising end-to-end reliability.

The core component of MIXIT is a novel network code that operates on small groups of bits, called symbols. It allows the nodes to opportunistically route correctly-received bits to their destination with low overhead. MIXIT's network code also incorporates an end-to-end error correction component that the destination uses to correct any errors that might seep through.

Further, there is proposal that pre-coded transmission scheme using random network coding outperforms the frequency diversity. Further, a MAC layer Random Network Coding (MRNC) has been introduced to avoid the overhead problems incurred by HARQ in the application of Wi-MAX. The random network coding can be applied in practical multi-hop wireless networks.

Since modulation selection scheme affects the system performance in a wireless communication network, a sophisticated modulation selection scheme is required for optimal adaptive modulation scheme. By employing Co-HM (i.e., hierarchical modulation is considered with the coded cooperation), modulation selection scheme can be simplified. However, the Co-HM scheme cannot take full advantage of the benefits of relay communication for the transmission of one encoding blocks due to code rate limitation. The code rate of the all received blocks cannot be decreased less than the mother code rate used for encoding of the transmitted block in the sender. For example, when a mother code of rate 1/2 is used in the sender for certain encoding blocks, regardless of how many relays decode the transmitted encoding blocks and transmit re-encoded redundancy, the receiver can only receive the codes with rate 1/2. To overcome the inefficiency of Co-HM, this disclosure proposes a scheme to take advantage of random network coding and coded cooperation with hierarchical modulation. And, this symbol-level random network coded communication strategy with hierarchical modulation is a novel technique that achieves an error free transmission with high efficiency.

As aforementioned, this disclosure proposes a joint symbol-level random network coding and hierarchical modulation scheme in a relay communication (denoted as "Co-NC"). In fact, simulation results for Additive White Gaussian Noise (AWGN) channel show that the proposed scheme, Co-NC outperforms the performance of Co-HM in terms of Packet Error Rate (PER).

A more detailed description of the present disclosure will be given as following. A hierarchical modulation is supported in various standards including Digital Video Broadcasting (DVB). The hierarchical modulation takes in two streams with differing service requirements and transmits both streams over the same radio frequency (RF) channel. In the hierarchical modulation, the two most significant bits of the 16 or 64 Quadrature Amplitude Modulation (QAM) symbol convey high priority service data which mapped with Quadrature Phase Shift Keying (QPSK). The two least significant bits (for 16QAM) or four bits (for 64QAM) are used to carry lower priority service data using QPSK or 16QAM respectively.

In the hierarchical modulation, the alpha ($\alpha$) parameter determines the offset, if any, of the constellation's origin. Depending on the offsets from the origin of the constellation, the hierarchical modulation can use uniform ($\alpha=1$) constellation or non-uniform ($\alpha=2, 3$) constellation. Hierarchical modulation with uniform constellation is using same constellation as normal modulation constellation but mapping bits to different priority classes. The Hierarchical modulation with non-uniform constellation offsets the origin of the constellation. Therefore, with greater offsets of the constellation from the origin, the distance between symbols in different quadrants increases so the high priority class robustness increases. However, the increase in $\alpha$ decreases the distances between differing symbols within each quadrant which makes it more difficult for the receiver to differentiate the symbol and thus reduces the robustness of the low priority class. Consequently, increasing the value of $\alpha$ increases the robustness of the high priority stream while decreasing the robustness of the low priority stream.

In this disclosure, 64QAM with three classes and $\alpha=1$ is employed which is shown in FIG. 1. Three classes are used to achieve finer granularity of block delivery performance and $\alpha=1$ is selected in order to make no change with normal modulation. With three classes the two most significant bits of the 64QAM symbol convey high priority service data. The two bits in the middle are used to carry medium priority service data and the two least significant bits are used to carry lower priority service data.

Figure 2:
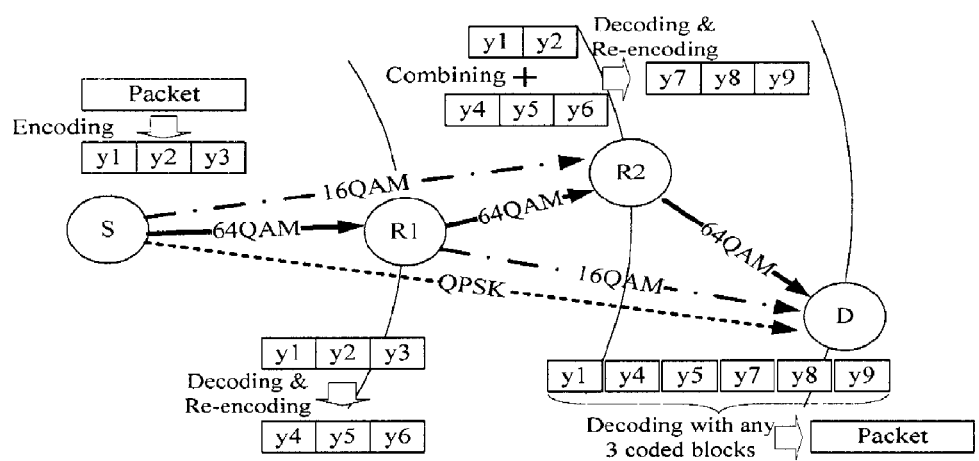
FIG. 2 shows an exemplary overview diagram illustrating data transmission employing the random network coding work with hierarchical modulation according to the present invention.

FIG. 2 shows an exemplary overview diagram illustrating data transmission employing the random network coding work with hierarchical modulation according to the present invention. As illustrated in FIG. 2, the sender (S) delivers data to the receiver (D) using the hierarchical modulation (64QAM, $\alpha=1$) with help of the relays (R1 and R2). The sender first divides each single packet into a number of small blocks and encodes the blocks using random network codes. Thereafter, each encoded block is mapped to one of the High Priority (HP), Medium Priority (MP), and Low Priority (LP) hierarchical modulation bit positions. Hence, the coded blocks, y1, y2 and y3 are mapped to the HP, MP, and LP bit positions respectively. The wireless broadcast nature allows the receiver and the relays to listen to the transmission of the sender. Depending on the link quality, receiver and relays detect different number of coded blocks. The sender (S) transmits in the first time slot, a first relay (R1) transmits in the second time slot and in the third time slot a second relay (R2) transmits. In the first time slot, whereas the first Relay (R1) is able to correctly detect y1, y2, and y3 and the second relay (R2) detects y1, and y2, the receiver (D) is only able to detect y1 correctly because its link condition is poor due to the long distance from the sender (S). After successful decoding of the received blocks, the first relay (R1) generates and transmits different coded blocks, y4, y5 and y6 using different random linear codes coefficients. In the second time slot, the second relay (R2) detects y4, y5, and y6 correctly and the receiver (D) detects y4, and y5. If the decoding is successful using received, y1, y2, y4, y5 and y6 in the second relay (R2), the second relay (R2) generates different coded blocks, y7, y8, and y9 and transmits them. Due to the rateless property of random network codes used across the blocks in the packet, all the blocks within one packet are equally useful. After, the receiver may correctly recover the original packet once it has enough correctly received error free blocks (i.e., "clean blocks"). Finally, the receiver can recover a packet using any three correctly received blocks out of detected blocks, y1, y4, y5, y7, y8, and y9. As number of relay nodes increases, receiver would collect more "clean blocks" which lead to higher probability of correct decoding.

The Co-NC (a joint symbol-level random network coding and hierarchical modulation scheme in a relay communication) has two advantages over Co-HM. First, in contrast to Co-HM where code rate is limited to the mother code rate for one encoding block transmission, Co-NC can decrease the code rate as the number of relays increases since relays transmit different coded blocks. Second, at each transmission, no matter where a node resides in a network, there is no need to perform proper modulation selection procedure to adapt to the link quality, because the same modulation scheme (hierarchical modulation) is used every time and small random coded blocks are adaptively transmitted over different priority classes.

Figure 3:
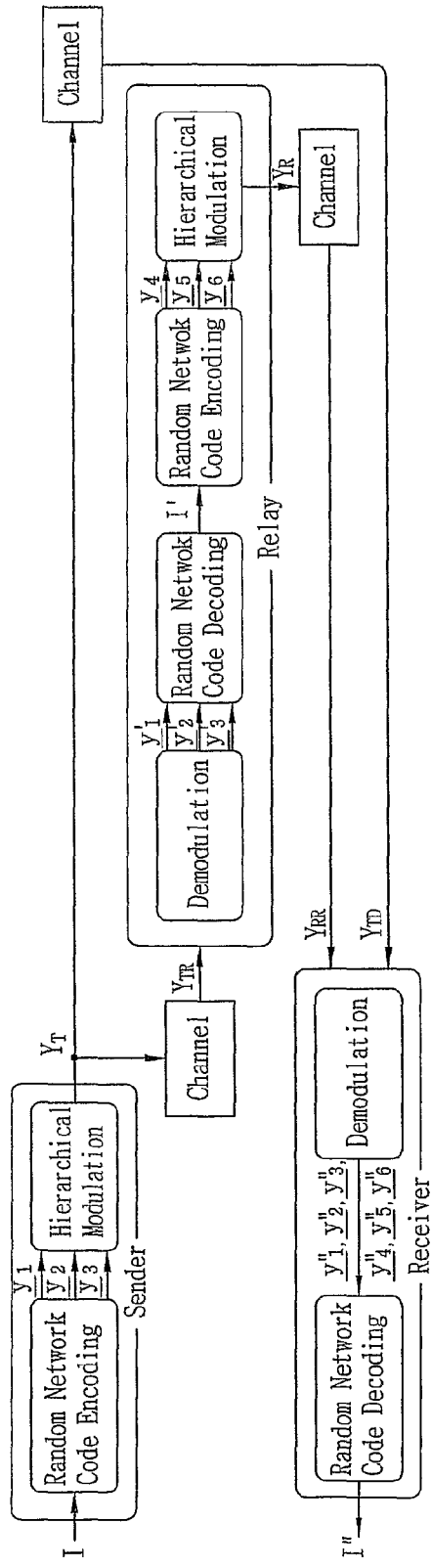
FIG. 3 shows an exemplary simplified block diagram illustrating data transmission employing the random network coding work with hierarchical modulation according to the present invention.

FIG. 3 shows an exemplary simplified block diagram illustrating data transmission employing the random network coding work with hierarchical modulation according to the present invention.

As depicted in FIG. 3. The encoder divides input bit streams into certain fixed length segments and adds Cyclic Redundancy Check (CRC) which is used for error detection at receivers. A CRC appended segment is called a packet. The sender encodes the packets using random network coding to generate coded blocks and maps each encoded block to one of the priority classes bit positions of hierarchical modulation. For exemplary purpose only, the operation in FIG. 3 is the case where the highest modulation is 64QAM. The operation with 16QAM and 256QAM hierarchical modulations is similar to 64QAM hierarchical modulation with differences of mapping independent coded blocks to different priority classes: 16QAM with two priority classes, 64QAM with three priority classes, and 256QAM with four priority classes. Each class of given priority class consists of two bits. In FIG. 3, the coded blocks are divided into three sets and mapped to three classes:

$$y_1 = \{y1, y4, y7, \ldots\}$$

$$y_2 = \{y2, y5, y8, \ldots\}$$

and $$Y_3 = \{y3, y6, y9, \ldots\}$$

are mapped to the HP, MP, and LP respectively. Symbols modulated with hierarchical modulation are transmitted to the receiver. The transmitted symbols can also be received by the relays due to the broadcast nature of wireless communication. If relays can successfully decode and recover the transmitted packet, relays generate different encoded blocks with the packet using different set of random coefficients. Then, using the same method the sender employed, relays transmit encoded blocks with hierarchical modulation. Similar to Co-HM relays, because relays perform decoding and encoding for one packet in Co-NC, Co-NC relays are required to have same amount of storage as Co-HM relays. The receiver collects all the encoded blocks transmitted from the sender and the relays.

The average of all bits' soft decision values in a coded block is used to decide whether the coded block is "clean" or not. Using the average soft decision values of coded blocks, the receiver selects "clean" blocks for decoding. Even though the probability of error is high for the coded blocks transmitted in the MP, and LP, there exist some coded blocks delivered error free among transmitted blocks in the MP and LP. Since the receiver selects the required number of coded blocks for decoding from all the received coded blocks, the more coded blocks the receiver receives the higher the probability of successful decoding it can achieve.

Since transmitters can generate and transmit as many coded blocks as necessary due to the flexibility of random network coding, the number of coded blocks that relays transmit can be dynamically adjustable depending on the channel conditions. Therefore, it is possible to efficiently utilize scarce wireless resources with the proposed scheme.

The random network code encoder divides each packet into blocks with a fixed size.

It is denoted that n as the number of blocks in a single packet, $x_i$ (i=1, 2, ..., n) as blocks in the packet, and $c_{ji}$ (i=1, 2, ..., n) as the set of random coefficients generated in a given Galois field, the size of which is determined by the number of bits in a block (e.g. for a block with 8 bits, $GF(2^8)$ would be used). A coded block $y_j$ can then be produced as $$y_j = \sum_{i=1}^{n} c_{ji} \cdot x_i.$$

Each coded block is a linear combination of all or a subset of the original data blocks. In this way, the encoder is able to generate a virtually unlimited number of coded blocks $y_j$ (j=1, 2, ...) using different sets of coefficients which are independent of one another, and any n of these coded blocks can be used to decode by inverting a matrix of coding coefficients. This is usually referred to as the rateless property.

In order to reduce the overhead of communicating random coefficients between the sender and the receiver for each coded block, the random coefficient matrix can be pre-generated and kept in the sender, the receiver, and the relays. In Co-NC, the sender transmits the index of the pre-generated random coefficients matrix that are used for encoding to the relays and receiver, as a part of the session control information before starting to transmit actual data packets. The soft decision value from the demodulator in the physical layer on the receiver is used for error detection. Using the average soft decision values of coded blocks, the receiver constructs a set of blocks to decode from all the received coded blocks, which always include top n blocks with the highest average soft decision value. The soft decision values are estimation of code bit log likelihood ratios (LLRs). In case of perfect channel knowledge, the estimation of code bit LLR under $2^K$-QAM can be obtained by the following equation (1):

$$\Lambda(b_k) = \ln \sum_{s^+ \in \{s : c_k = +1\}} \exp\left(-\frac{|y_s - \alpha s^+|^2}{\sigma^2}\right) - \ln \sum_{s^- \in \{s : c_k = -1\}} \exp\left(-\frac{|y_s - \alpha s^-|^2}{\sigma^2}\right) \quad (1)$$

where k is the bit order of used 2K-QAM symbol; ys is the received QAM symbol; α is the channel gain;

$$S(s \in \{s_1, s_2, \ldots, s_{2^K}\}, s = b_1 b_2 \ldots b_K)$$

is the transmitted QAM symbol; $\sigma^2$ is the variance of noise which is complex Gaussian random variable with zero mean.

When choosing a proper coded block size, it may appear that a smaller block is always preferable, as a smaller block leads to better delivery rate in the presence of error. Unfortunately, a block that is too small will lead to an inherent problem that is hard to address. A block with m bits uses $GF(2^m)$ to perform random network coding, and a smaller number of bits in a block leads to a smaller size of the Galois Field, with a smaller degree of freedom when coefficient vectors are randomly chosen. This leads to a higher probability of producing linearly dependent blocks with random network coding. It is therefore important to choose an appropriate size for the coded block, so that the block is sufficiently small, but there is still sufficient degree of freedom to produce randomized coefficient vectors that are linearly independent of one another.

Because enough number of error free blocks is required to recover the original packet in random network coding, block error rate is more important than bit error rate. If coded blocks are transmitted using normal modulation, block error rate is same for all coded blocks. However, block error rate of coded blocks transmitted over HP bit positions of hierarchical modulation is lower than block error rate of coded blocks transmitted over LP bit positions of hierarchical modulation. Therefore, overall block error rate can be decreased and decreased block error rate eventually lowers packet error rate.

Figure 4:
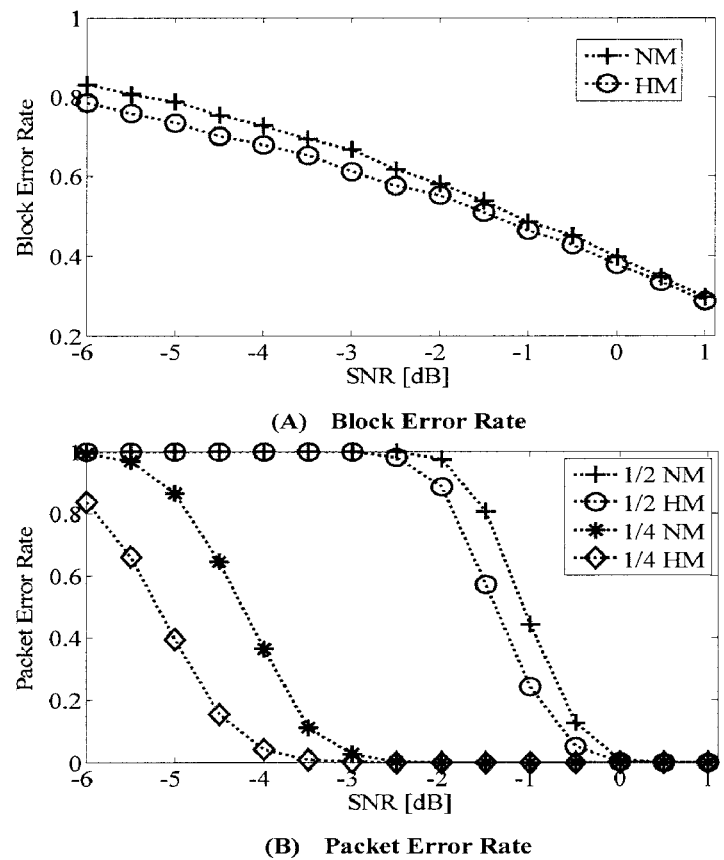
FIG. 4 shows a block error rate and packet error rate comparison between random network coding with hierarchical modulation and normal modulation.

FIG. 4 shows a block error rate and packet error rate comparison between random network coding with hierarchical modulation and normal modulation. In fact, the simulation results for Additive White Gaussian Noise (AWGN) channel between a sender and a receiver are shown in FIG. 4. The benefit of jointly using hierarchical modulation with random network coding is more substantial when operating range is low SNR region which is the case with low code rate. As SNR gets lower, block error rate using hierarchical modulation becomes lower than the one using normal modulation. Because low code rate of random network coding can be achieved by increasing number of relays, the proposed scheme of jointly using hierarchical modulation with random network coding perfectly fits for relay communication.

The other benefit of joint use of hierarchical modulation with random network coding is simplicity of modulation scheme selection. In order to meet required block error rate with normal modulation, proper modulation scheme has to be selected. However, modulation scheme can be fixed with hierarchical modulation and simple coded block mapping to different priority class can guarantee certain block error rate. This scheme is extremely useful when there are relays with different channel conditions. Relays can adaptively collect error free coded blocks.

To evaluate the performance, the PER performance of Co-NC with Co-HM for the same size packet have been compared. Since a main concept of present disclosure is a random network coding with hierarchical modulation in relay communication, PER performance and delay performance of random network coding with normal modulation in single hop transmission is omitted.

Figure 5:
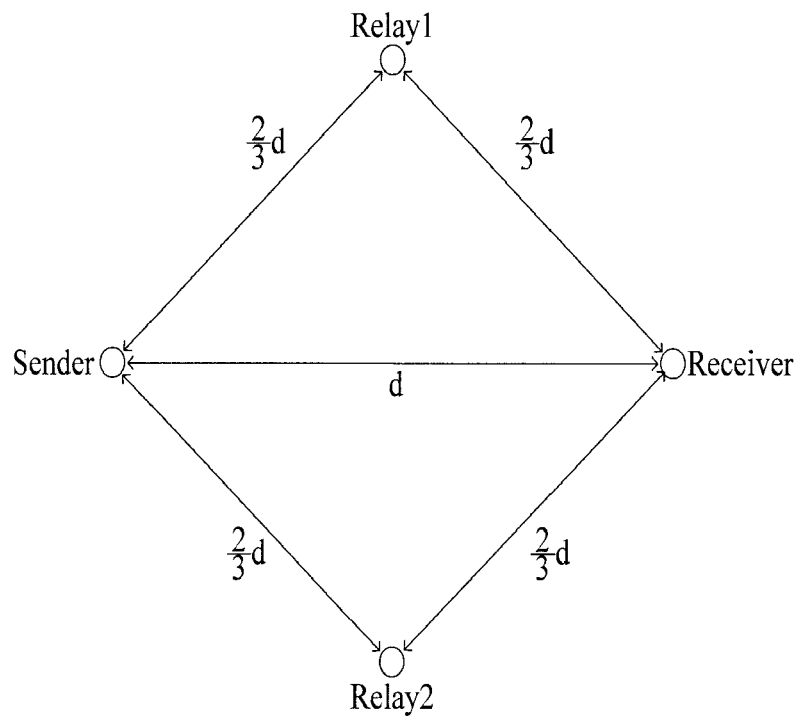
FIG. 5 shows a network topology used in a simulation.

With respect to the Co-HM, convolutional codes of rate 1/2 with well known soft combining and soft output Viterbi decoding algorithm are used. Also, "decode-and-then-relay" strategy for each intermediate nodes for Co-HM is used. For simplicity, the 16QAM hierarchical modulation for both the Co-NC and the Co-HM are used in the evaluation. For fair comparison with the Co-HM, in the Co-NC simulation, the source transmits 2n number of coded blocks to make the rate 1/2 when the original packet is divided into n number of blocks and the relays, which have successfully decoded the original packet, transmit new n number of coded blocks. It is assumed that a path-loss exponent is 3.52 and that two relays are located between the sender and the destination with a distance d. FIG. 5 shows a network topology used in a simulation. Each relay is located along the middle point d/2 so that the distance from the relay to the sender and to the destination equals 2d/3, forming a diamond shape where each edge is 2d/3 long. It is performed that the simulation based on the scenario where two protocols transfer a large file over AWGN channel between a sender and a receiver with help of one or two relays. A file is divided into segments with 16 bit CRC appended to each segment. A segment with CRC is called a packet. In the simulation, a packet size of 512 bits is simulated. Each packet is divided into a number of blocks, on which random network coding is performed. A block size of 8 bits is used which is chosen based on the extensive simulation and achieves the best performance.

Figure 6:
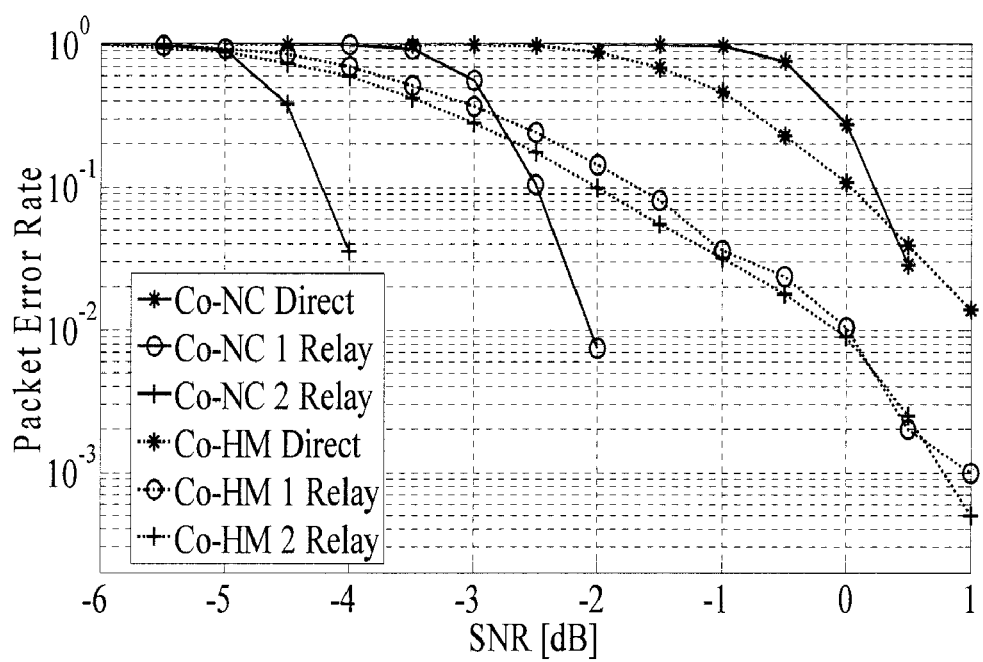
FIG. 6 shows a packet error rate performance of Co-NC and Co-HM.

The simulation results are shown in FIG. 6. When there is no cooperation (direct link from the sender to the receiver), the Co-NC shows worse performance than the Co-HM for low Signal-to-Noise-Ratio (SNR) values because random network coding does not provide error correction capability for corrupted bits. However, the Co-NC shows better performance than the Co-HM as SNR gets higher because the Co-NC uses "clean" coded blocks selected from all the received coded blocks either through the HP or LP in decoding. The one relay case, where one relay is helping the packet transmission, shows similar performance trend to the direct case. The Co-HM only benefits very little from the inclusion of the second relay. That is because the code rate of the Co-HM cannot be decreased less than the mother code rate used for encoding of the transmitted block in the sender. The gain mainly comes from the soft combining of blocks received from two relays. The Co-NC outperforms the Co-HM as the number of relays grows due to the rateless property of random network coding. The proposed relay communication scheme with joint symbol-level random network coding and hierarchical modulation achieves approximately 2.1 dB, and 3.9 dB gain at PER of 10?2 with one relay and two relays respectively as compared to the conventional coded cooperation scheme.

In this disclosure, the use of network coding to improve relay communication using hierarchical modulation has been explored. The joint use of random network coding and hierarchical modulation makes modulation selection scheme simple and relay communication more effective with flexible rate adjustment regardless of link quality. Using the proposed scheme, the communication scheme of multi-hop relay consumer device networks is expected to be simplified substantially which will eventually reduce implementation cost. Simulation results with AWGN channels showed that the proposed system can outperform the conventional coded cooperation scheme with hierarchical modulation.

The present invention may provide a method for transmitting data in wireless communication system, the method comprising: dividing an input bit stream into segments; adding error detection code into each segments of the divided input bit stream in order to generate a packet; dividing the generated packet into a plurality of blocks with fixed size; coding each of the plurality of blocks using a random linear coding in order to generate coded block bits; mapping the coded block bits to one of a hierarchical modulation bit positions, wherein the hierarchical modulation bit positions are a group of bits representing a priority class; and transmitting the plurality of modulated symbols, wherein the priority class is at least one of a high priority, a medium priority, and a low priority, the all steps are implemented in a multi-hop relay networks, and the coded block bits in a coded block are rearranged according to a bit error probability.

It can be also said that the present invention may provide a method for receiving data in wireless communication system, the method comprising: receiving a plurality of modulated symbols; generating coded block bits by selecting bits from the hierarchical modulation bit positions of the received plurality of modulated symbols, wherein the hierarchical modulation bit positions is a group of bit representing the priority class; and performing a random linear decoding with the coded blocks to restore a packet, wherein the priority class is at least one of a high priority, a medium priority, and a low priority, and the all steps are implemented in a multi-hop relay networks.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for transmitting data in wireless communication system, the method comprising:
dividing an input bit stream into segments;
adding error detection code into each segments of the divided input bit stream in order to generate a packet;
dividing the generated packet into a plurality of blocks with fixed size;
coding each of the plurality of blocks using a random linear coding in order to generate coded block bits;
mapping the coded block bits to one of a hierarchical modulation bit positions, wherein the hierarchical modulation bit positions are a group of bits representing a priority class; and
transmitting the plurality of modulated symbols.

2. The method of claim 1, wherein the priority class is at least one of a high priority, a medium priority, and a low priority.

3. The method of claim 1, wherein the all steps are implemented in a multi-hop relay networks.

4. The method of claim 1, wherein the coded block bits in a coded block are rearranged according to a bit error probability.

* * * * *